Figure 5:
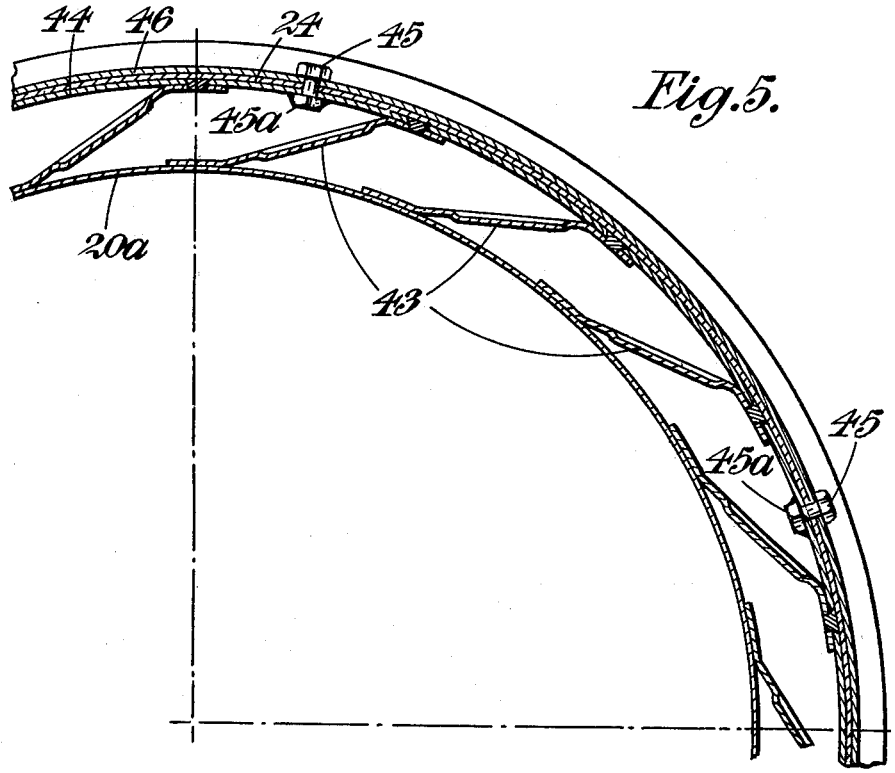

Nov. 8, 1955  A. A. LOMBARD  2,722,801
EXHAUST DUCTING ARRANGEMENTS FOR GAS-TURBINE ENGINES
Filed May 15, 1950  3 Sheets-Sheet 1
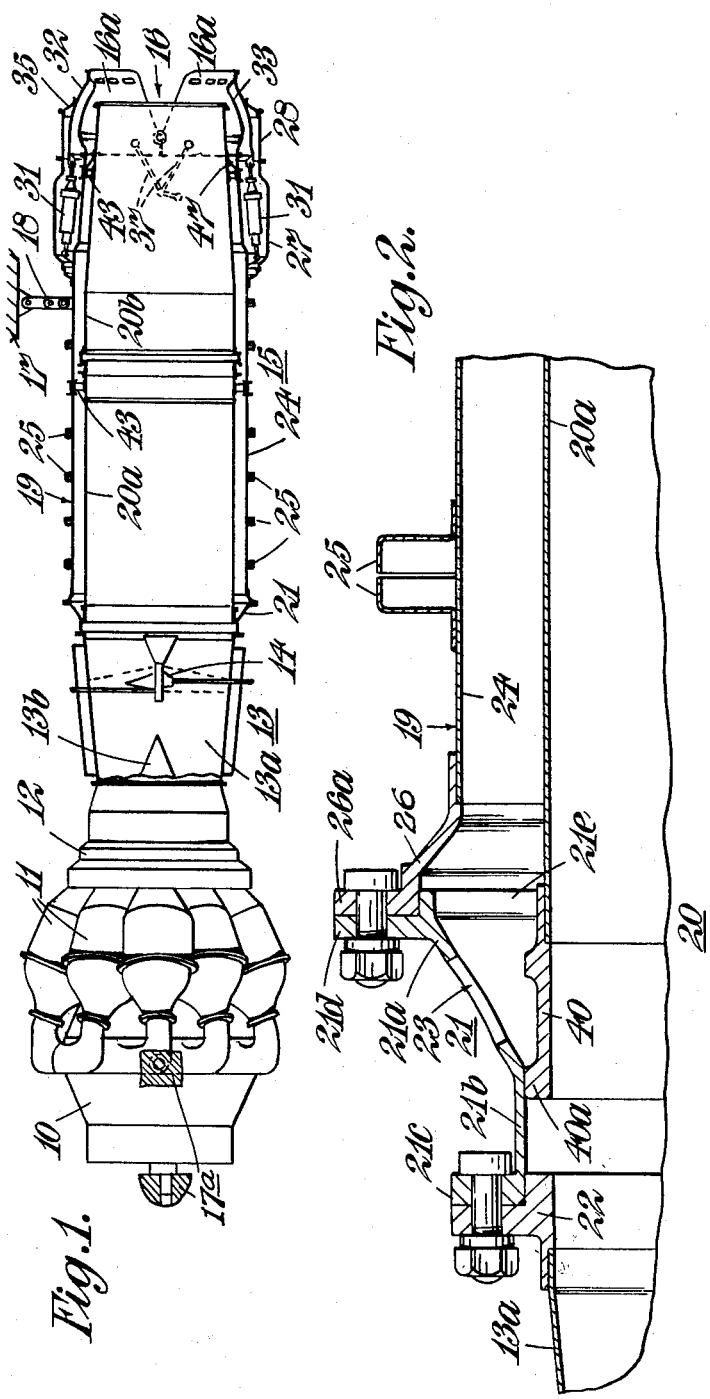
INVENTOR
A. A. LOMBARD

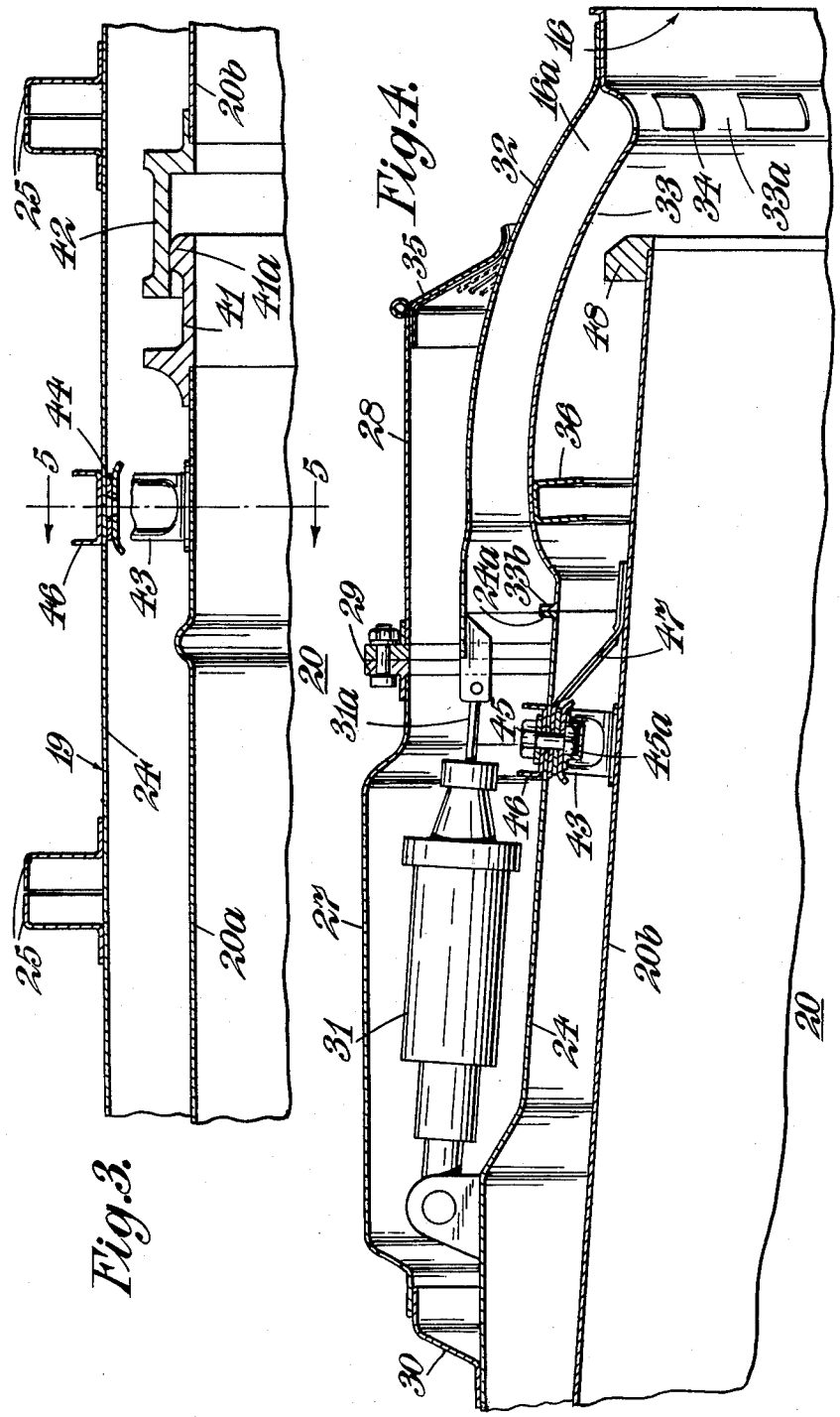

United States Patent Office 2,722,801
Patented Nov. 8, 1955

2,722,801

EXHAUST DUCTING ARRANGEMENTS FOR GAS-TURBINE ENGINES

Adrian Albert Lombard, Allestree, Derby, England, assignor to Rolls-Royce Limited, Derby, England, a British company Application May 15, 1950, Serial No. 162,008

Claims priority, application Great Britain May 24, 1949

6 Claims. (Cl. 60—35.6)

This invention relates to exhaust ducting of gas-turbine engines. A gas-turbine engine normally comprises a compressor system, combustion equipment and a turbine system, the combustion equipment being arranged to receive compressed air from the compressor system, to have fuel burnt in it, and to deliver the combustion products to the turbine system. The exhaust from the turbine system is carried away to atmosphere through suitable exhaust ducting.

This invention has for an object to provide an improved exhaust ducting arrangement which has an important application to gas-turbine engines in which fuel is burnt in the exhaust gas stream from the turbine system, for example, for the purpose of augmenting the propulsive thrust of an aircraft jet-propulsion gas-turbine engine.

Hitherto, exhaust ducting for use with gas-turbine engines has comprised a pipe which is connected with the exhaust assembly of the engine, and supported either wholly by the engine or partly by the engine and partly by being connected to the aircraft or other structure. With such arrangements, the pipe is not only subjected internally to high temperatures but also has large structural loads applied to it so that it is necessary to design the exhaust ducting to be capable of withstanding the structural loads at elevated temperatures. This has resulted in a complicated structure of considerable weight.

It has been proposed in order to insulate aircraft structure surrounding the jet pipe of an aircraft gas-turbine engine from thermal radiation from the exhaust pipe, to enclose the pipe in a sleeve to leave an annular space between the pipe and sleeve, through which space a flow of cooling air is induced by an ejector effect obtained at the propelling nozzle carried on the outlet end of the jet-pipe. In such prior arrangement, however, the exhaust pipe itself remained as the main load-carrying structure whilst the outer sleeve was substantially unstressed.

The present invention has for an object to provide an improved exhaust ducting arrangement.

According to the present invention, there is provided for a gas-turbine engine an exhaust ducting arrangement comprising an outer tubular structure arranged to be supported in part at least directly from the engine and to form the main load-bearing structure of the exhaust ducting arrangement, and an imperforate tubular member arranged within said outer tubular structure in spaced relation thereto so as to afford an annular air passage between the outer tubular structure and the imperforate tubular member, there being inlets to said passage formed in said outer tubular structure adjacent its end nearer the engine and outlets from the passage adjacent its end remote from the engine, and means to support said imperforate tubular member from said outer tubular structure to permit relative axial expansion therebetween, with the passage through the imperforate member in gas-sealing connection with the exhaust outlet from the engine.

Preferably the imperforate tubular member is so supported within the outer tubular structure as to be free from structural loads. It is also preferred that the imperforate tubular member be constructed from sheet metal in a plurality of tubular sections each of which sections adjacent one end is located axially with respect to the outer tubular structure and, adjacent its opposite end, has an axial sliding gas-sealing engagement with an adjacent ducting part.

With an exhaust ducting arrangement as above set forth the parts of the exhaust ducting arrangement which are subjected to very high temperatures are not subjected to major structural loads and the parts which form the major structural load-carrying members are not subjected to excessive temperatures whereby they are weakened. Moreover, in the arrangement as set forth, the various parts of the exhaust ducting arrangement are free for relative thermal expansion and the load-bearing structure is insulated against excessive heating by an induced flow of cooling air between the load-bearing structure and the exhaust duct wall.

The exhaust ducting arrangement may also comprise an adjustable-area nozzle at the outlet from the inner tubular member, in accordance with U. S. Patent No. 2,699,645, the adjustable nozzle parts being carried by the outer tubular structure, and arranged on adjustment to vary the effective area of the nozzle, said adjustable nozzle parts being made hollow to afford air passages having inlets open to said annular air passage and outlets so located in relation to the nozzle that a cooling air flow is induced through said annular air passage by the exhaust gases flowing through the nozzle.

Figure 6:
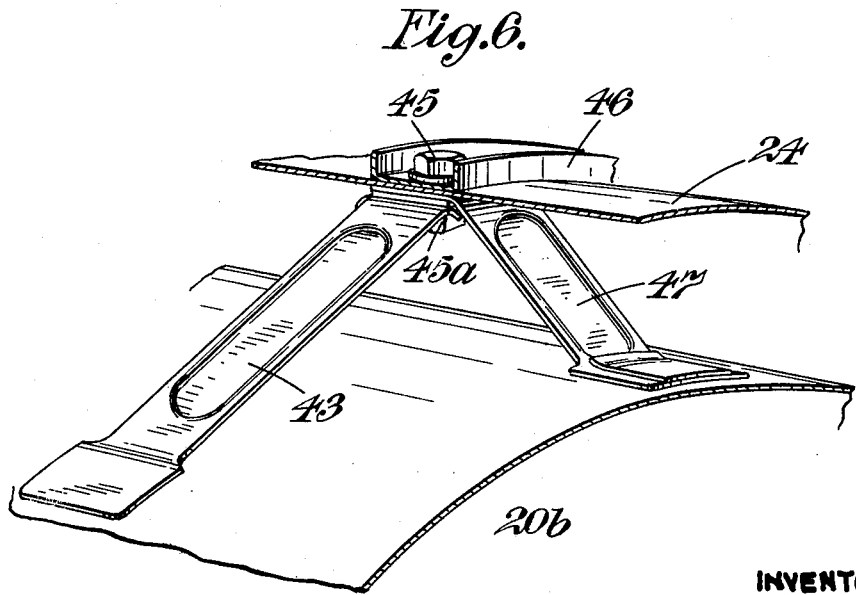

One construction of exhaust ducting according to this invention suitable for use with gas-turbine engine of the jet-propulsion type will now be described with reference to the accompanying drawings in which:

Figure 1 illustrates diagrammatically a gas-turbine engine with the exhaust ducting connected thereto, Figures 2, 3 and 4 are sections on an enlarged scale through parts of the exhaust ducting, Figure 5 is a section on the line 5—5 of Figure 3, and Figure 6 is a perspective view of part of Figure 4.

Referring to Figure 1, there is illustrated a power-plant suitable for use in the jet propulsion of aircraft and comprises a gas-turbine engine having a compressor 10, combustion equipment formed by a plurality of separate combustion chambers 11 which combustion chambers are connected to receive compressed air from the compressor 10, a turbine 12 connected to receive heated air from the combustion chambers 11 and an exhaust assembly 13 connected to the outlet from the turbine 12. The heated gases after passing through the turbine 12 flow into a passage in the exhaust assembly 13 which passage is formed between an outer wall 13a and an inner conical wall 13b and flow through this passage into a section of the exhaust assembly 13 which is a full circular cross-section. Arranged in this latter section of the exhaust assembly 13, there is fuel injection means 14 for use when the exhaust gases are to be reheated prior to their leaving the power-plant.

Connected with the outlet end of the exhaust assembly 13 of the gas-turbine engine 10, 11, 12, 13 there is an exhaust ducting arrangement 15. The exhaust gases flowing through the exhaust assembly 13 pass into the exhaust ducting 15 and flow through it to a propelling nozzle 16 provided at the outlet end of the exhaust ducting 15.

The exhaust ducting arrangement 15 is supported partly by the gas-turbine engine and partly from external structure 17 which may be part of an aircraft structure in which the power-plant is mounted. The exhaust ducting 15 may be connected with the structure 17 in any convenient manner, for example through a linkage support 18 which permits axial movement of the exhaust ducting arrangement 15 relative to the structure 17 to accommodate relative axial expansion therebetween.

Referring now to Figures 2 to 6, the exhaust ducting arrangement 15 comprises essentially an outer load-bearing tubular structure 19 and an inner exhaust-gas-duct-forming tubular structure 20.

The outer load-bearing tubular structure 19 comprises a ring 21 having a cylindrical extension 21b extending from the narrower end of a frusto-conical portion 21a, a radial flange 21c at the free end of the cylindrical portion 21b, the said flange 21c forming a bolting flange by which the ring can be secured to an end ring 22 welded to the outer wall 13a of the exhaust assembly 13, and a radial flange 21d on the wider end of the frusto-conical portion 21a. The frusto-conical portion 21a of the ring 21 is also formed with a series of circumferentially spaced apertures 23 the purpose of which will appear hereafter. The outer structure 19 also comprises a sheet metal tubular member 24 which is reinforced by a series of circumferential reinforcing webs 25 welded thereto, and the sheet metal tubular member 24 is secured to the ring 21 by means of a flanged end ring 26 provided with a radial bolting flange 26a to abut the bolting flange 21d. The ring 21 is provided with a short axial cylindrical extension 21e which spigots into the end ring 26 to locate the end ring coaxially with the ring 21.

The sheet metal tubular member 24 is encircled towards its end remote from the gas-turbine engine 10, 11, 12, 13 by a pair of sheet metal tubular members 27, 28 which are joined together over bolting flanges 29 and the tubular member 27 is connected with the tubular sheet metal member 24 by a flanged portion 30 welded to these members. The sheet metal tubular members 27, 28 are spaced radially outwards from the member 24 and provide accommodation for a pair of hydraulic rams 31 which are pivoted at one end to the member 24 and have their operating piston rods 31a connected to sheet metal nozzle segments 16a which are pivotally mounted on the end of the member 24. On operation of the rams the segments 16a are caused to swing to adjust the effective area of the nozzle 16.

The nozzle segments 16a comprise an outer sheet metal part-spherical wall 32 and an inner sheet metal part-spherical wall 33 having an out-turned portion 33a by which the walls are secured together. A series of apertures 34 are provided in the out-turned portion 33a. The upstream end of the wall 33 is formed with a flange 33b which abuts against a corresponding flange 24a on the end of the sheet metal tubular member 24 when the segments 16a are in their fully retracted position as shown in Figure 4.

The sheet metal tubular member 28 carries at its free end a spring metal sealing device 35 which co-operates with the external surface of the sheet metal walls 32 of the segments 16a to have gas-sealing engagement therewith throughout the movement of the segments 16a. The sheet metal part-spherical wall 33 is also reinforced by means of a channel section part-ring member 36 which acts as a gas-sealing device as will be described hereinafter.

The segments 16a are linked together by a suitable linkage 37 so that they move together in a desired manner.

The inner exhaust-gas-duct-forming tubular structure 20 comprises a number of tubular sheet metal sections (illustrated as two 20a, 20b) which sections are supported within the outer load-bearing tubular structure 19 each to be capable of relative axial and radial expansion with respect to the structure 19 and in gas-sealed communication with the exhaust passage through the exhaust assembly 13.

The section 20a has welded to its inlet end an end ring 40 provided with a bead-like edge 40a to co-operate with the internal cylindrical surface of the cylindrical extension 21b of the ring 21 to form a gas-sealing sliding joint between the section 20a and the structure 19.

The section 20a has secured to its outlet end a further end ring 41 having a bead-like edge 41a to co-operate in gas-sealing engagement with the internal cylindrical surface of an end ring 42 welded to the inlet end of the section 20b which tapers towards its outlet end to provide the fixed member of nozzle 16.

The section 20a is located axially with respect to the structure 19 by means of at least 3 (but preferably a multiplicity, say 18) compression/tension members 43 in the form of sheet metal straps which are welded at their inner ends to the section 20a and extend substantially tangentially from the section 20a, in the same sense, towards the structure 19. The straps are secured, for example as by riveting, at their outer ends to a ring 44 which fits within the part 24 of the structure 19 and is secured thereto by means of bolts 45 passing through a channel section reinforcing ring 46, the part 24 and the ring 44 to engage with nuts 45a welded to the inner surface of the ring 44.

The section 20b is carried from the part 24 of the structure 19 by a similar arrangement of tangential straps 43 and is also connected with the part 24 through a series of axially-arranged sheet metal strap members 47, the inner ends of which are welded to the section 20b. In this case instead of the outer ends of the straps 43 being riveted to a ring 44, they are secured to the part 24 by the bolts 45 passing through them and the bolts 45 are also arranged to extend through the outer ends of the strap members 47. In this case the nuts 45a are conveniently welded to the inwardly-facing surface of the outer ends of the strap members 43.

The section 20b is provided at its outlet end with a reinforcing ring 48 which when the swinging segments 16a are swung to reduce the effective areas of the nozzle 16 co-operates with the channel section ring 36 to limit the swinging movement of the segments 16a and also to afford a gas seal.

From the foregoing description it will be seen that the sections 20a and 20b of the inner tubular structure 20 are free for relative axial expansion and relative radial expansion with respect to the structure 19 while at the same time leakage of the exhaust gas flowing in the exhaust ducting arrangement is prevented by the telescopic seals 40a, 21b and 41a, 42.

It will be seen moreover that the sections 20a and 20b will not be required to carry large structural stresses such as bending loads due to flexing of the supporting structure 17 and so can be made of light gauge material although they are liable to be subjected to very high temperatures. The turbine is supported from a further supporting structure 17a by a conventional trunnion structure.

Since the structure 19, which is the principal load-carrying structure for the exhaust ducting arrangement, is spaced from the sections 20a, 20b, the structure 19 will not be subjected to excessively high temperatures, so that its strength will not be seriously affected by the high temperatures experienced in the exhaust ducting arrangement even when fuel is being burnt in the exhaust gases.

The load-bearing structure 19 is protected against excessive heating in use by the flow of cooling air through the annular space between the structure 19 and the inner tubular structure 20, the air entering the annular space through the apertures 23 in ring 21 and flowing rearwardly through the space to outlets located adjacent the jet nozzle 16. When the swinging segments 16a are in the position shown, the outlet for the cooling air is formed between the ring 48 and the inner surface of the wall 33, and when the swinging segments 16a are moved to a position in which the channel-section part-rings 36 engage with the flange 48, the air flows through the space between the inner and outer walls 33 and 32 and out through the apertures 34 in the portions 33a of the swinging segments 16a. Whatever the position of the swinging segments 16a the flow of cooling air through the annular space between the load-bearing structure 19 and the duct wall forming structure 20 is induced by the passage of the high velocity exhaust gases through the nozzle in close proximity to the outlets from the annular space.

I claim:

1. An arrangement comprising a gas turbine engine, an external structure wherein the gas-turbine engine is mounted, and an exhaust ducting arrangement leading to atmosphere from said gas-turbine engine and comprising an outer tubular structure supported in part directly from the engine and in part from said external structure and forming the main load-bearing structure of the exhaust ducting arrangement and an imperforate exhaust-gas-duct-forming tubular member supported within said outer tubular structure and in spaced relation to said outer structure, said imperforate tubular member extending for at least substantially the entire length of said outer tubular structure, whereby an annular air passage is afforded between said structure and said member; cooling air inlet means to said passage formed in said outer structure adjacent its end nearer the engine; air outlet means leading to atmosphere from said passage adjacent its end remote from the engine; means to support said imperforate member within said outer structure to permit relative axial expansion therebetween; and gas sealing means between the tubular member and the outer tubular structure whereby leakage of exhaust gas into said passage is prevented.

2. An exhaust ducting arrangement as claimed in claim 1, wherein said imperforate tubular member is so supported within the outer tubular structure as to be free from major structural loads.

3. An exhaust ducting arrangement as claimed in claim 1, wherein said imperforate tubular member is constructed from sheet metal in a plurality of tubular sections in end to end relation, each of which sections adjacent one end, is fixed axially with respect to the outer tubular structure and, adjacent its opposite end, has axial-sliding gas-sealing engagement with an adjacent part of the ducting arrangement.

4. An exhaust duct structure for a gas-turbine engine comprising an outer load-bearing tubular structure, which outer load-bearing tubular structure comprises a bolting ring having a pair of axially-spaced bolting flanges and interconnecting the bolting flanges a first portion affording a cylindrical inner surface and a second and frusto-conical portion having therein a series of circumferentially-spaced apertures, a reinforced tubular member secured to the bolting flange adjacent said frusto-conical portion, and a structure affording nozzle-adjusting means carried at the end of said reinforced tubular member remote from said ring; and an inner exhaust-gas-duct-forming tubular structure supported within said reinforced tubular member in spaced relation thereto and extending from adjacent said bolting ring to adjacent said nozzle-adjusting means, said inner tubular structure comprising a plurality of imperforate tubular sections arranged end to end and each connected with the outer load-bearing tubular structure adjacent one end, said sections having at their adjacent ends co-operating end rings affording a gas-sealing sliding joint, and the end of the section adjacent said bolting ring being formed to co-operate with said first portion of the bolting ring to afford a gas-sealing sliding joint between the inner tubular structure and the outer load-bearing tubular structure.

5. An arrangement comprising a gas-turbine engine including a turbine and exhaust ducting structure on the downstream side of said turbine, aircraft structure, the engine being mounted within the aircraft structure in spaced relation thereto, and exhaust ducting means by which exhaust gases are conveyed to atmosphere from said gas-turbine engine; said exhaust ducting means comprising an outer load-bearing tubular structure, said outer tubular structure forming the main load-bearing structure of the exhaust ducting means, and said outer tubular structure being connected at its upstream end to said exhaust ducting structure of the engine to be supported therefrom, mounting means connected to said outer tubular structure at a point spaced from said engine and connected to said aircraft structure, an imperforate exhaust-gas-duct-forming tubular member supported within and in spaced relation to said outer tubular structure, said imperforate tubular member having its upstream end in communication with said exhaust ducting structure to receive exhaust gas therefrom and said imperforate tubular member extending for substantially the same length as said outer tubular structure whereby an annular air passage is afforded between said outer tubular structure and said imperforate tubular member, air inlet means formed in said outer structure adjacent its end nearer the engine to place said passage in communication with the space between said outer tubular structure and said aircraft structure, air outlet means leading to atmosphere from said annular air passage adjacent its end remote from the engine, means to support said imperforate member within said outer tubular structure to permit relative axial expansion therebetween, and gas sealing means on said imperforate tubular member at its upstream end and on the structure surrounding said imperforate tubular member whereby leakage of exhaust gas into said passage is prevented.

6. An arrangement as claimed in claim 5, wherein said mounting means are pivotally connected to said outer tubular structure at a point spaced from the engine, and are pivotally connected to the aircraft structure, to permit relative axial movement of the outer tubular structure and the aircraft structure.

References Cited in the file of this patent

UNITED STATES PATENTS

| 2,432,359 | Streid | Dec. 9, 1947 |
| 2,481,330 | Neal | Sept. 6, 1949 |
| 2,493,641 | Putz | Jan. 3, 1950 |
| 2,551,229 | Alford et al. | May 1, 1951 |
| 2,564,042 | Walker | Aug. 14, 1951 |
| 2,579,114 | Halford et al. | Dec. 18, 1951 |
| 2,591,676 | Clayton, Jr. | Apr. 8, 1952 |
| 2,597,253 | Melchior | May 20, 1952 |

FOREIGN PATENTS

| 578,010 | Great Britain | June 12, 1946 |
| 587,512 | Great Britain | Apr. 29, 1947 |
| 588,082 | Great Britain | May 14, 1947 |